(12) United States Patent
Yoshida et al.

(10) Patent No.: US 9,181,094 B2
(45) Date of Patent: Nov. 10, 2015

(54) METHOD FOR PRODUCING PEROXYMONOSULFURIC ACID AND APPARATUS FOR CONTINUOUSLY PRODUCING PEROXYMONOSULFURIC ACID

(75) Inventors: Kiyoshi Yoshida, Katsushika-ku (JP);
Tetsuo Koshitsuka, Tokyo (JP); Kaoru Tsuyuki, Tokyo (JP); Wakana Uesugi, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 12/444,287

(22) PCT Filed: Oct. 18, 2007

(86) PCT No.: PCT/JP2007/070343
§ 371 (c)(1),
(2), (4) Date: Apr. 3, 2009

(87) PCT Pub. No.: WO2008/047864
PCT Pub. Date: Apr. 24, 2008

(65) Prior Publication Data
US 2010/0112094 A1 May 6, 2010

(30) Foreign Application Priority Data

Oct. 18, 2006 (JP) .................................. 2006-284218
Oct. 18, 2006 (JP) .................................. 2006-284219

(51) Int. Cl.
*C01B 15/08* (2006.01)
*B01F 13/10* (2006.01)
(Continued)

(52) U.S. Cl.
CPC .............. *C01B 15/08* (2013.01); *B01F 13/1016* (2013.01); *B01F 15/065* (2013.01); *B01J 19/0013* (2013.01); *B01J 19/2415* (2013.01);
*B01F 5/06* (2013.01); *B01F 2015/0221* (2013.01); *B01J 2219/002* (2013.01); *B01J 2219/00099* (2013.01);
(Continued)

(58) Field of Classification Search
None
See application file for complete search history.

(56) References Cited

U.S. PATENT DOCUMENTS 2,789,954 A * 4/1957 Fell .......................... 252/186.22
3,432,546 A 3/1969 Oringer et al.
(Continued)

FOREIGN PATENT DOCUMENTS

CN 1528660 A 9/2004
CN 1778669 A 5/2006
(Continued)

OTHER PUBLICATIONS

International Search Report for PCT/JP2007/070343, mailed Nov. 27, 2007.
(Continued)

*Primary Examiner* — Melvin C Mayes
*Assistant Examiner* — Sheng H Davis
(74) *Attorney, Agent, or Firm* — Nixon & Vanderhye P.C.

(57) ABSTRACT

The invention provides a method for producing a peroxymonosulfuric acid solution with high stability, including the steps of mixing 35 mass % or more of hydrogen peroxide and 70 mass % or more of sulfuric acid to react them, cooling the reaction solution to 80° C. or lower within five minutes after initiation of the mixing step, and diluting the reaction solution with water four times or more as much as the reaction solution by mass.

15 Claims, 2 Drawing Sheets

(51) Int. Cl.
  *B01F 15/06* (2006.01)
  *B01J 19/00* (2006.01)
  *B01J 19/24* (2006.01)
  *B01F 5/06* (2006.01)
  *B01F 15/02* (2006.01)

(52) U.S. Cl.
  CPC ............... *B01J 2219/00186* (2013.01); *B01J 2219/00204* (2013.01); *B01J 2219/00231* (2013.01); *B01J 2219/00238* (2013.01)

(56) References Cited

U.S. PATENT DOCUMENTS

| | | | |
|---|---|---|---|
| 3,900,555 A | | 8/1975 | Jourdan-Laforte |
| 3,939,072 A | | 2/1976 | LaForte |
| 4,315,014 A | | 2/1982 | Mich et al. |
| 5,141,731 A | * | 8/1992 | Meier et al. ............... 423/521 |
| 5,250,280 A | | 10/1993 | Bertsch-Frank et al. |
| 5,304,360 A | | 4/1994 | Lane et al. |
| 5,429,812 A | * | 7/1995 | McDonogh et al. ......... 423/521 |
| 5,470,564 A | * | 11/1995 | Manganaro et al. ......... 423/521 |
| 5,879,653 A | * | 3/1999 | Castrantas et al. ............ 423/513 |
| 6,028,045 A | | 2/2000 | Bianchetti et al. |
| 6,090,297 A | | 7/2000 | Castrantas et al. |
| 6,368,570 B1 | * | 4/2002 | Dilber ........................... 423/513 |
| 7,090,820 B2 | * | 8/2006 | Martin .......................... 423/513 |
| 2005/0031530 A1 | | 2/2005 | Martin |

FOREIGN PATENT DOCUMENTS

| | | |
|---|---|---|
| GB | 738407 | 10/1955 |
| GB | 1117336 | 6/1968 |
| JP | 57-132591 | 8/1982 |
| JP | 6-501672 | 2/1994 |
| JP | 08-295504 | 11/1996 |
| JP | 10-095602 | 4/1998 |
| JP | 2005-289743 | 10/2005 |
| WO | 9207791 * | 5/1992 |
| WO | WO 97/00225 | 1/1997 |
| WO | 2004/024673 A | 3/2004 |
| WO | WO 2005/016511 | 2/2005 |

OTHER PUBLICATIONS

Written Opinion of the International Searching Authority for PCT/JP2007/070343, mailed Nov. 27, 2007.
European Search Report issued for European Patent Application No. 07830077.9-1270, dated Nov. 15, 2011.
European Search Report issued for corresponding European Patent Application No. 12170010.8-1270/2495215 dated Sep. 26, 2012.
European Office Action issued for corresponding European Patent Application No. 07 830 077.9-1270 dated Oct. 1, 2012.
First Examination Report dated Jun. 27, 2014, re Indian Application No. 2365/DELNP/2009 filed Apr. 13, 2009.
Office Action dated Apr. 27, 2015 issued in corresponding Chinese Application No. 201410003315.1 (5 pages).

* cited by examiner

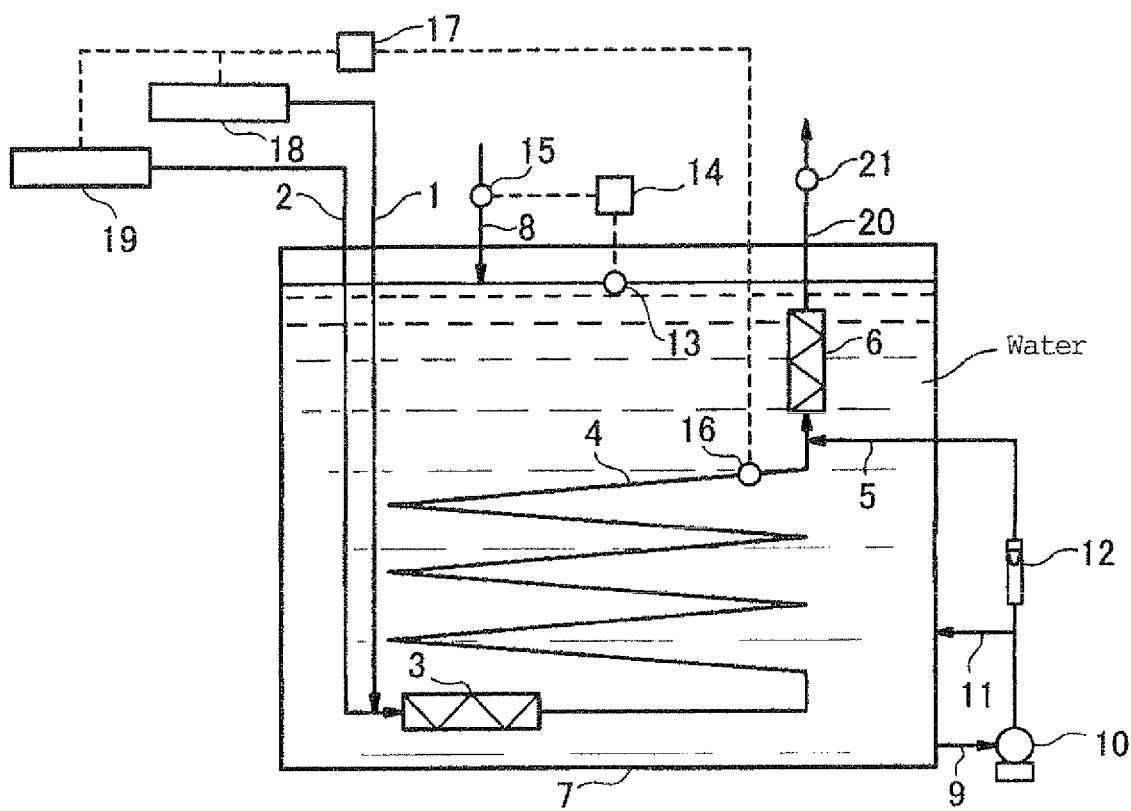

METHOD FOR PRODUCING PEROXYMONOSULFURIC ACID AND APPARATUS FOR CONTINUOUSLY PRODUCING PEROXYMONOSULFURIC ACID

This application is a National Phase of International Application No. PCT/JP2007/070343, filed 18 Oct. 2007, which claims priority to Japan Application No(s). 2006-284218, filed 18 Oct. 2006 and 2006-284219, filed 18 Oct. 2006, the entire contents of each of which are hereby incorporated by reference.

TECHNICAL FIELD

The invention relates to a method for producing peroxymonosulfuric acid in high yields with high stability. The invention also relates to an apparatus for continuously producing peroxymonosulfuric acid. The peroxymonosulfuric acid thus generated is used for the treatment of wastewater, bleaching treatment of chemical pulp for paper-making, and the like.

BACKGROUND ART

Peroxymonosulfuric acid, which is sometimes called Caro's acid, is represented by the chemical formula of $H_2SO_5$ and is conventionally known to have excellent bleaching effect and sterilizing effect. In light of the strong oxidation ability of peroxymonosulfuric acid, expectations are placed on the uses as an etching agent or pickling agent for surface treatment of metals such as copper or copper alloys, a sterilization agent, and an agent for wastewater treatment.

It is well known that peroxymonosulfuric acid can be produced by the reaction of hydrogen peroxide with concentrated sulfuric acid. However, the production of peroxymonosulfuric acid is accompanied by generation of large quantities of heat, and the peroxymonosulfuric acid solution thus produced is too unstable to be stored for a long period of time. Accordingly, the peroxymonosulfuric acid has been employed in the laboratory, but scarcely put to industrial use.

Then, some production methods are proposed to eliminate the shortcoming of poor stability of the peroxymonosulfuric acid solution. To solve the problem of poor stability of the generated peroxymonosulfuric acid, on-site production methods (capable of production near the place where the product is to be put to practical use) are proposed so that the product can be used in the shortest possible time after completion of the production and the loss due to the decomposition can be minimized.

In consideration of the decomposition of peroxymonosulfuric acid by significant heat generation after hydrogen peroxide is mixed with concentrated sulfuric acid, a method is disclosed where the reaction time is restricted to several seconds and the reaction product thus obtained is cooled to normal temperatures or lower and subsequently diluted with cold water. This method needs a lot of energy and a cooling unit, so that the method is not considered to be suitable for the mass production of peroxymonosulfuric acid although the method is applicable to the small-scale production (see PTL 1).

There is also proposed a method where hydrogen peroxide is allowed to react with concentrated sulfuric acid in a vessel equipped with a stirrer, and immediately after completion of the reaction, the reaction product thus obtained is continuously added to cyanogen-containing wastewater. According to this method, hydrogen peroxide and concentrated sulfuric acid are inevitably added to the high-temperature peroxymonosulfuric acid solution that has been just generated with evolution of heat. Consequently, the yield of peroxymonosulfuric acid is drastically decreased by the decomposition of hydrogen peroxide (see PTL 2).

A method of producing peroxymonosulfuric acid in a hermetically sealed tube type reaction chamber is proposed. This method employs the improved small-sized reaction vessel in consideration of the problems in the prior art that the plant for manufacturing the peroxymonosulfuric acid becomes too large, the cooling facilities are too bulky, and the on-site apparatus costs too much. According to this method, the unit for reacting hydrogen peroxide with concentrated sulfuric acid can be made compact, but the problem that the generated peroxymonosulfuric acid is decomposed by heat generated during the reaction still remains unsolved (see PTL 3).

In order to improve the yield of peroxymonosulfuric acid in the reaction, a method is disclosed where hydrogen peroxide is added in some portions to concentrated sulfuric acid. In this method the reaction temperature is controlled using cold water (water from a chiller) while hydrogen peroxide is stepwise added in some portions, which will consequently cause the problem that the apparatus is made larger in size and more complicated. In addition, the above-mentioned method does not take any steps to stabilize the generated peroxymonosulfuric acid (see PTL 4).

To stabilize the generated peroxymonosulfuric acid solution, there is proposed a method of controlling the pH of the solution within the pH range of 0.5 to 2.0. Although the solution may be stabilized by the pH control within the above-mentioned range, cooling operation becomes essential. The pH control of the peroxymonosulfuric acid solution, which is industrially produced in large quantities by the on-site production method, requires the cooling step because a large amount of heat is generated. It is not easy to make the apparatus compact. Further, the pH control requires a large amount of alkali, which is not favorable in economical terms (see PTL 5).

In order to produce peroxymonosulfuric acid, the apparatus employing the method of reacting highly concentrated sulfuric acid with highly concentrated hydrogen peroxide is conventionally known. When the batch production is tried to obtain a, large quantity of peroxymonosulfuric acid, the increase in temperature due to heat generation at the time of reaction cannot be easily controlled, so that the yield of peroxymonosulfuric acid is unfavorably decreased in the synthesis. There is also the problem that the stability of the generated peroxymonosulfuric acid is generally so poor that long-term storage thereof will become difficult.

To prevent the above-mentioned problems, a variety of apparatuses for continuously producing peroxymonosulfuric acid adjacent to the place where the product is to be used (so-called "on site") are proposed.

The PTL 2 discloses a reaction vessel having two reactant transporting pipes symmetrically disposed and a jacket which allows the reaction product to overflow when the amount of product exceeds a certain level. However, this apparatus is not provided with sufficient cooling performance. As a result, when the production scale is industrially increased, the decrease of reaction yield or the increase of cost related to the apparatus will become inevitable.

Further, the PTL 3 discloses the method for producing peroxymonosulfuric acid efficiently by improving the shape of the reaction chamber. However, there is neither specific description about the cooling means against the generation of heat, nor description about the means for preventing the concentrated solution of peroxymonosulfuric acid from coming in direct contact with the operators in the event that the concentrated solution leaks out.

SUMMARY OF INVENTION

Technical Problem

A first object of the invention is to provide a method for producing a peroxymonosulfuric acid solution wherein decomposition of the peroxymonosulfuric acid can be minimized during the production thereof and the peroxymonosulfuric acid solution can be stored over a long period of time after the production thereof.

Solution to Problem

The inventors of the invention have intensively studied the method for producing a peroxymonosulfuric acid solution from hydrogen peroxide and sulfuric acid. As a result, it has been found that the peroxymonosulfuric acid solution can be made more stable by mixing hydrogen peroxide with sulfuric acid, immediately after that, cooling the solution thus obtained to predetermined temperatures within a given period of time, and thereafter diluting the solution thus obtained with a predetermined amount of water. The invention has been thus accomplished based on the above-mentioned findings.

Namely, the invention relates to:

(1) a method for producing a peroxymonosulfuric acid solution with high stability, comprising the steps of mixing 35 mass % or more of hydrogen peroxide and 70 mass % or more of sulfuric acid to react them at 90° C. or higher, cooling the resulting reaction solution to 80° C. or lower within five minutes after initiation of the mixing step, and then diluting the reaction solution with water weighing four times or more as much as the reaction solution;

(2) the method in the above-mentioned item (1), wherein the reaction solution is cooled to 40° C. or higher and 80° C. or lower;

(3) the method in the above-mentioned item (1), wherein the reaction solution is diluted with water weighing 4 times or more and 10 times or less as much as the reaction solution;

(4) the method in the above-mentioned item (1), wherein the sulfuric acid containing iron of 20 ppm or less is used;

(5) the method in the above-mentioned item (1), further comprising the step of adding an aqueous alkaline solution to the reaction solution after the reaction solution is cooled to 80° C. or lower; and (6) a method for producing a peroxymonosulfuric acid solution, characterized by comprising the steps of mixing 35 mass % or more of hydrogen peroxide and 70 mass % or more of sulfuric acid to react them at a temperature higher than 80° C., cooling the reaction solution to 80° C. or lower within five minutes after initiation of the mixing step, and then diluting the reaction solution with water weighing four times or more as much as the reaction solution.

A second object of the invention is to provide an apparatus for continuously producing peroxymonosulfuric acid with high stability and high safety.

As a result of the intensive investigation about the apparatus for continuously producing peroxymonosulfuric acid, the inventors of the invention have found that, by using a static mixer, which is disposed underwater, peroxymonosulfuric acid can be constantly synthesized in high yields, and the concentrated peroxymonosulfuric acid solution can be prevented from leaking out directly to the outside of the apparatus. The invention has been thus achieved. Namely, the invention relates to an apparatus for continuously producing peroxymonosulfuric acid, comprising a first static mixer for mixing hydrogen peroxide with sulfuric acid to react them, a second static mixer for mixing the reaction solution and water for dilution, and a transporting pipe for transporting the reaction solution from the first static mixer to the second static mixer, with the first static mixer and the reaction solution transporting pipe being disposed underwater in a vessel.

Advantageous Effects of Invention

The first advantage of the method of the invention is that the peroxymonosulfuric acid solution can be produced in high yields and, that the produced peroxymonosulfuric acid solution can keep stable for an extended period of time. This is produced by cooling the peroxymonosulfuric acid solution to a temperature lower than the predetermined temperature within a given time and subsequently diluting the solution to a predetermined concentration or less using water such as generally used industrial water. The method of the invention does not always require any special cooling facilities such as a refrigerator. As the result, the method of the invention can solve the problem that the generated peroxymonosulfuric acid is decomposed by large quantities of heat generated during the production of the peroxymonosulfuric acid solution. The method of the invention can also solve the problem that the generated peroxymonosulfuric acid solution cannot be stored for a long period of time The second advantage of the method of the invention is that the peroxymonosulfuric acid solution produced from high-purity hydrogen peroxide and high-purity sulfuric acid is applicable to the field of semiconductors or the like which do not like impurities. The method of the invention does not require any special chemicals in order to stabilize the peroxymonosulfuric acid solution, while some of the conventional methods include the step of controlling the pH of the peroxymonosulfuric acid solution or adding a stabilizer thereto.

The third advantage of the method of the invention is that sulfuric acid containing a certain amount of iron can be used. The method of the invention can solve the problem that hydrogen peroxide and the generated peroxymonosulfuric acid solution are greatly decomposed, due to impurities (for example, iron-containing compounds) present in sulfuric acid, during the production of the peroxymonosulfuric acid solution. This problem leads to decrease in the yield of peroxymonosulfuric acid. The method of the invention can also solve the problem that heat is increasingly generated, due to impurities present in sulfuric acid, during the reaction. This problem also leads to the decrease in the yield of peroxymonosulfuric acid.

The fourth advantage of the method of the invention is that the decomposition reaction of hydrogen peroxide and the generated peroxymonosulfuric acid solution is minimized and thus peroxymonosulfuric acid can be produced safely. This is produced by cooling and diluting the peroxymonosulfuric acid solution generated within a short period of time. The method of the invention can solve the problem that sudden generation of heat and oxygen gas due to the decomposition reaction of hydrogen peroxide and the generated peroxymonosulfuric acid solution may unfavorably cause an accident such as a burst of the reaction tube or the like when the iron content in sulfuric acid employed is high.

The fifth advantage of the method of the invention is that the method does not necessarily require a refrigerator for cooling the generated peroxymonosulfuric acid solution. According to the method of the invention, the peroxymonosulfuric acid solution can be produced using a compact apparatus equipped with reactant-feed pumps, a mixer for blending the reactants, a reaction vessel, a mixer for diluting the generated peroxymonosulfuric acid solution and the like.

The sixth advantage of the method of the invention is that a pipe for conveying the peroxymonosulfuric acid solution after dilution or a container for storing the same after dilution can be made of inexpensive materials such as SUS304, SUS316 or the like, which can decrease the cost of equipment. This comes from the step of diluting the generated peroxymonosulfuric acid of the invention.

According to the invention, an apparatus for continuously producing peroxymonosulfuric acid with high safety and high stability can be realized at relatively low cost. By using the apparatus of the invention, peroxymonosulfuric acid with high stability can be obtained in high yields.

BRIEF DESCRIPTION OF DRAWINGS

FIG. 3 is a diagram showing still another example of the apparatus of the invention for continuously producing peroxymonosulfuric acid.

DESCRIPTION OF EMBODIMENTS

Figure 1:
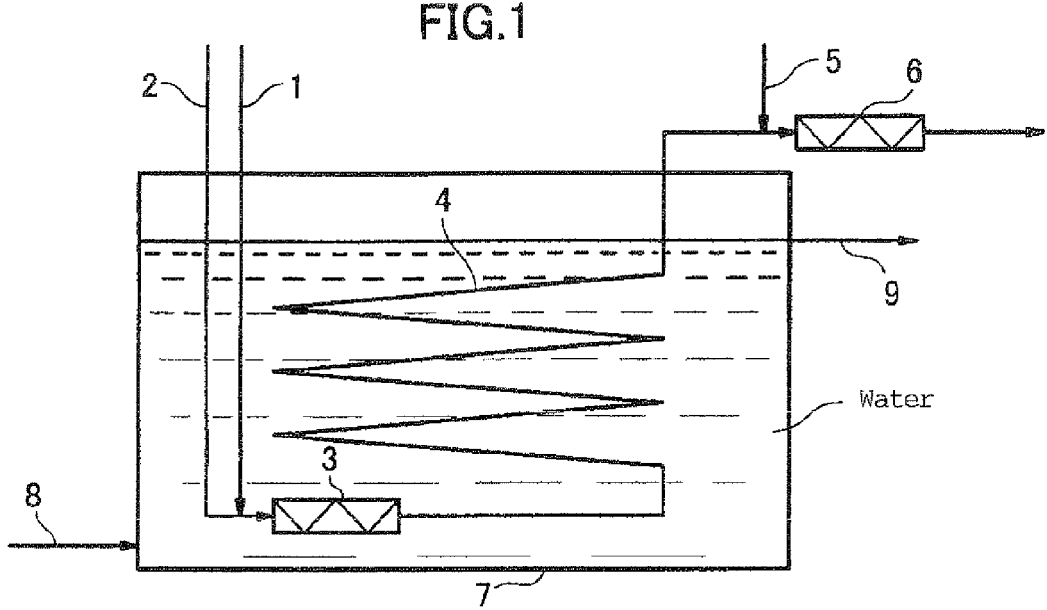
FIG. 1 is a diagram showing one example of the apparatus of the invention for continuously producing peroxymonosulfuric acid.

Peroxymonosulfuric acid is obtained by mixing sulfuric acid with hydrogen peroxide. The molar ratio of sulfuric acid to hydrogen peroxide is preferably in the range of 1 to 5. When the above-mentioned molar ratio is less than 1, the generated peroxymonosulfuric acid solution contains hydrogen peroxide in high concentration, which may have an undesirable effect depending on its application. Further, the molar ratio of less than 1 is not preferable from the economical viewpoint. When the molar ratio is 5 or higher, the concentration of the generated peroxymonosulfuric acid is decreased, while the concentration of sulfuric acid is increased. Such a high concentration of sulfuric acid may not be acceptable in some applications and the step of neutralization with an alkali such as sodium hydroxide or the like may be required, which is considered economical disadvantage.

General sulfuric acid for industrial use can be employed in the invention. The concentration of sulfuric acid may be 70 to 98 mass %, preferably 90 to 98 mass %, and more preferably 95 to 98 mass %. One of the important qualities required for sulfuric acid is the content of iron. When the iron content in sulfuric acid is high, hydrogen peroxide and peroxymonosulfuric acid readily decompose with evolution of heat, which will consequently lower the yield of peroxymonosulfuric acid to be generated. In light of this, the iron content may be 20 ppm or less, preferably 10 ppm or less, and more preferably 5 ppm or less.

Hydrogen peroxide generally used as the industrial chemical can be used. It is possible to use the chemical products having a concentration of 35 to 90 mass %, preferably 45 to 90 mass %, and more preferably 60 to 90 mass %.

The reaction of sulfuric acid with hydrogen peroxide may be carried out in a batch system or continuous system. The latter is more favorable in the industrial-scale production. As the mixer employed in the continuous reaction, a static mixer is usable. In consideration of significant heat generation in the static mixer, it is preferable to use as the material for the static mixer Hastelloy (registered trademark) C or Teflon (registered trademark).

To almost complete the reaction of hydrogen peroxide and sulfuric acid in a short time, that is, about one minute, the reaction temperature, i.e., the maximum temperature that the reaction solution reaches during the reaction, may preferably be controlled to a temperature higher than 80° C. The above-mentioned maximum temperature will be hereinafter referred to as the reaction temperature. The lower the reaction temperature is, the slower the reaction speed becomes, which results in a decrease of the yield of peroxymonosulfuric acid. On mixing hydrogen peroxide and sulfuric acid, a large quantity of heat is generated. Therefore, the reaction temperature usually exceeds 80° C. unless the reaction system is thoroughly cooled. The reaction temperature is preferably 90° C. or higher. The upper limit of the reaction temperature may be 120° C. or lower, although there is no particular upper limit to the reaction temperature. When the reaction temperature is too high, the decomposition of hydrogen peroxide and peroxymonosulfuric acid are increased. In the invention, the temperature of the generated peroxymonosulfuric acid solution is decreased to 80° C. or lower within 5 minutes after the initiation of mixing by starting to cool the reaction solution simultaneously with the initiation of mixing or immediately after the initiation of mixing. Thus, peroxymonosulfuric acid can be obtained. The upper limit to the cooling temperature may be preferably 70° C. or lower, more preferably 60° C. or lower, and further preferably 50° C. or lower; while the lower limit to the cooling temperature may be preferably 25° C. or higher, and more preferably 30° C. or higher. Further preferably, the reaction solution may be cooled to 80° C. or lower and 40° C. or higher within five minutes. The time between initiation of the mixing step and the diluting step may be 10 seconds or more, more preferably 30 seconds or more, and further preferably one minute or more. When the above-mentioned time is too short, the reaction does not proceed satisfactorily, thereby decreasing the yield of peroxymonosulfuric acid. According to the production method of the invention, it is possible to cool hydrogen peroxide and sulfuric acid prior to the reaction step and continue the cooling operation during the reaction. In this case, the temperature of the reaction solution is also controlled to 80° C. or lower within 5 minutes after the initiation of mixing. If the above-mentioned temperature is higher than 80° C., the yield is lowered by the decomposition of peroxymonosulfuric acid when the generated peroxymonosulfuric acid is diluted. To cool the reaction solution to a temperature lower than 40° C. will produce the problems that the unit for cooling the solution is made bigger in size and the amount of water necessary for cooling is made larger.

For the cooling operation, the reaction vessel may be cooled from the outside thereof using water, refrigerant or air. The use of water is preferable. As the cooling water, water cooled by a refrigerator may be used. General industrial water having normal temperature is also available. The size of the reaction vessel is determined by the overall heat-transfer coefficient of the materials for the reaction vessel. The shape and the material of the reaction vessel may be determined so that the generated peroxymonosulfuric acid solution can be cooled to 80° C. or lower within five minutes after the initiation of mixing. In light of this, Hastelloy (registered trademark) C or Teflon (registered trademark) is preferably used as the material.

The peroxymonosulfuric acid solution thus cooled to 80° C. or lower within five minutes remains unstable as it is, and therefore cannot be stored for a long period of time. Then, in the production method of the invention, the solution is diluted with water weighing four times or more as much as the reaction solution. The mass of water used for dilution is preferably 4 times or more and 20 times or less. When the mass of the dilution water is less than 4 times, the stability of peroxymonosulfuric acid will become less sufficient and the yield will become lower. Dilution with water of more than 20 times by mass will decrease the concentration at the point of use, thereby delaying a reaction therein. Fresh water may be newly prepared for dilution, but the water that has been used for cooling the reaction vessel during the synthesis of peroxymonosulfuric acid can be preferably employed. In the application of semiconductors or the like, ultrapure water may be used. The temperature of the water used for dilution may be 40° C. or lower. To carry out the diluting operation, water for dilution may be mixed in a static mixer.

The peroxymonosulfuric acid solution thus produced is transported to the treatment site or the like as it is, or transported after stored in a tank.

The produced peroxymonosulfuric acid solution is strong acid, and therefore may not be used as it is in some applications. In such a case, the pH of the peroxymonosulfuric acid solution may be increased by the addition of alkali such as sodium hydroxide or the like. Preferably, the alkali may be added after the reaction solution of peroxymonosulfuric acid is cooled to 80° C. or lower. For this purpose, there are some possible methods. For example, cooling of the reaction solution, addition of alkali, and then dilution may be successively carried out; some alkali may be added simultaneously with the dilution; some alkali may be added after dilution; or some alkali may be added to the dilution water in advance. Although the amount of alkali may be freely determined so as to obtain a desired pH value of the peroxymonosulfuric acid solution, the calculated amount of alkali that is neutralization equivalent or less to the sulfuric acid subjected to the reaction may be added in order not to impair the stability of peroxymonosulfuric acid.

As previously mentioned, the production method of the invention can be carried out in a continuous system by using a static mixer. Then, the invention can also provide an apparatus for production which employs the production method mentioned above. The apparatus for production of the invention will now be explained.

As the static mixer used in the invention, general static mixers having elements therein can be employed. There is no particular limit to the shape of the mixer, and therefore tube type mixers are usable, for example. The shape and the number of the elements are not particularly limited. For example, it is possible to use a mixer equipped with two or more blade-shaped elements twisted in different directions, each element being prepared by twisting a rectangular plate at an angle of about 180° with respect to the central axis in the lengthwise direction of the plate.

In a first static mixer for use in the invention, hydrogen peroxide is mixed with sulfuric acid to react them, thereby generating peroxymonosulfuric acid. Hydrogen peroxide and sulfuric acid used herein are those as previously explained. By connecting each of the feed pipes for hydrogen peroxide and sulfuric acid directly to the first static mixer, hydrogen peroxide and sulfuric acid can be mixed together in the first static mixer. Alternatively, the feed pipes for hydrogen peroxide and sulfuric acid may be connected together upstream from the first static mixer to mix hydrogen peroxide with sulfuric acid. In this case, it is preferable to make the two reactants meet at a position as close to the first static mixer as possible.

In order to increase the mixing efficiency in the static mixer, it is preferable to pressurize hydrogen peroxide using a pump for hydrogen peroxide and also pressurize sulfuric acid using a pump for sulfuric acid, and thereafter feed hydrogen peroxide and sulfuric acid thus pressurized into the first static mixer. Preferably, a back pressure control valve may be attached to each of the feed pipes for hydrogen peroxide and sulfuric acid to prevent the one material from flowing into the feed pipe for the other material or to prevent backflow of the reaction solution. The position of the back pressure control valve may preferably be as close to the meeting point of the two materials as possible.

Hydrogen peroxide and sulfuric acid are reacted in the first static mixer. The flow rates of both materials and the capacities of the first static mixer and a reaction solution transporting pipe are designed so that the reaction of hydrogen peroxide with sulfuric acid can be completed until they reach a second static mixer through the reaction solution transporting pipe after hydrogen peroxide and sulfuric acid come in contact with each other in the first static mixer. For example, when 45% hydrogen peroxide and 98% sulfuric acid are reacted by being introduced as a reaction solution into a first static mixer at a flow rate of 1 $m^3$/h, it is possible to use a first static tube type mixer with an inner diameter of 15 to 30 mm and a length of about 0.1 to 1 m equipped with a plurality of mixing elements prepared by twisting rectangular plates at an angle of 180 degrees and a reaction solution transporting pipe with an inner diameter of 15 to 30 mm and a length of about 20 to 200 m. The molar ratio of the reactants and the reaction temperature may be adjusted within the ranges as mentioned previously.

The reaction solution released from the first static mixer is cooled while passing through the reaction solution transporting pipe and then sent to the second static mixer, where the reaction solution is mixed with water for dilution. The length of the reaction solution transporting pipe is determined so that the temperature of the reaction solution can be decreased preferably to 80° C. or lower immediately before the reaction solution meets the water for dilution. When the temperature of the reaction solution is too high before the step of dilution, the mixture of peroxymonosulfuric acid and water tends to easily generate hydrogen peroxide and sulfuric acid. This will increase the loss of peroxymonosulfuric acid once generated in the first static mixer.

The reaction solution can meet the dilution water in the second static mixer by connecting each of the reaction solution transporting pipe and the dilution water feed pipe directly to the second static mixer. Alternatively, the reaction solution transporting pipe and the dilution water feed pipe may be connected together upstream from the second static mixer to bring the reaction solution into contact with the water for dilution. In this case, it is preferable to make the contact point of the reaction solution with the dilution water as close to the second static mixer as possible. The flow rate of the reaction solution and the length of the reaction solution transporting pipe are adjusted so that the reaction solution can come in contact with the water for dilution in the second static mixer within five minutes after entering the first static mixer. The amount of water for dilution used in the second static mixer is as previously mentioned. Upstream from the second static mixer, a back pressure control valve may be preferably attached to each of the reaction solution transporting pipe and the dilution water feed pipe in order to prevent the one from flowing into the pipe for the other or to prevent backflow of the diluted reaction solution. The back pressure control valve may preferably be located as close to the contact point as possible.

The pressure settings of the back pressure control valves attached to the reaction solution transporting pipe and the dilution water feed pipe are determined so that the pressures applied to the reaction solution in the first static mixer and the reaction solution transporting pipe and the pressure applied to the water for dilution may be equal to or higher than the pressure applied to the diluted reaction solution in the second static mixer. In addition, the pressure settings of the back pressure control valves attached to the hydrogen peroxide feed pipe and the sulfuric acid feed pipe are determined and the specifications of the feed pumps for hydrogen peroxide and sulfuric acid are determined so that the pressures applied to hydrogen peroxide and the pressure applied to sulfuric acid may be equal to or higher than the pressure applied to the reaction solution in the first static mixer. In general, when a comparison is made between the liquid volumes of the reaction solution and the dilution water to be mixed in the second static mixer, the volume of the water for dilution is overwhelmingly larger than that of the reaction solution. Therefore, the pressure to the diluted reaction solution in the second static mixer will be almost the same as the feed pressure applied to the dilution water. In light of this, the feed pressures applied to hydrogen peroxide and sulfuric acid are preferably determined to be equal to or higher than the feed pressure applied to the water for dilution.

The diluted peroxymonosulfuric acid solution thus released from the second static mixer is sent to the treatment site, for example, a wastewater treatment facility, pulp bleaching plant or the like, as it is, where the diluted peroxymonosulfuric acid solution is put to use. Or the diluted peroxymonosulfuric acid solution may be stored in a tank until put to practical use.

According to the invention, the first static mixer and the reaction solution transporting pipe are disposed underwater in a vessel. In other words, the outer surfaces of the first static mixer and the reaction solution transporting pipe come in contact with water. To be more specific, a water vessel is charged with water in which a first static mixer and a reaction solution transporting coiled pipe are disposed. According to one of the preferred embodiments of the invention, a housing unit of the static mixer and the transporting pipe are made a double tube, with the gap between the inner tube and the outer tube being filled with water. All the outer surfaces of the first static mixer and the reaction solution transporting pipe may not come in contact with water. The first static mixer may be disposed underwater entirely or partially. The reaction solution transporting pipe may be located entirely or partially underwater. The vessel may hold water of normal temperature or cold water cooled by a refrigerator.

Further, it is preferable to provide the apparatus with a stirrer for stirring water in the vessel or a pump for circulating water in the vessel. To stir or circulate the water in the vessel and to control the amount and the temperature of water to be added to the vessel, it is also preferable that the apparatus be provided with means for detecting the temperature of the water held in the vessel.

The first purpose of setting the first static mixer and the reaction solution transporting pipe underwater in the vessel is to cool the reaction solution because the liquid temperature of the reaction solution is raised by heat generated on mixing hydrogen peroxide and sulfuric acid. In light of this, industrial water or the like may be charged into the vessel through the inlet thereof and the heated water may be discharged from the outlet thereof. To reduce the amount of water charged into the vessel and discharged therefrom, an additional unit such as a heat exchanger is needed for cooling the water held in the vessel.

The second purpose of setting the first static mixer and the reaction solution transporting pipe underwater in the vessel is to ensure safety. Namely, the highly-concentrated and high-temperature peroxymonosulfuric acid can be promptly diluted in the event of leakage from, for example, the pipe connecting sections around the first static mixer and the reaction solution transporting pipe. In consideration of this, it is desirable that all the outer surfaces of the first static mixer and the reaction solution transporting pipe be completely in contact with water. For the same reason, the meeting point of the hydrogen peroxide feed pipe and the sulfuric acid feed pipe and the second static mixer may also be disposed underwater in the vessel.

In the invention, a pump may be dispose to feed water present in the vessel into the second static mixer as the water for dilution. The use of water in the vessel as the dilution water has the advantages that the amount of water consumption can be economically reduced and the attachment of a unit for cooling water in the vessel can be omitted. In addition, even if the peroxymonosulfuric acid might leak out from the first static mixer and the reaction solution transporting pipe, the peroxymonosulfuric acid leaking and scattering into the vessel can finally be transported together with the water for dilution to the treatment site or the storage tank. Namely, the highly concentrated peroxymonosulfuric acid can be prevented from outflow. To detect the leakage of peroxymonosulfuric acid, the apparatus may be equipped with a unit for detecting the peroxide or acid present in water held in the vessel.

In the case where the water held in the vessel is used as the dilution water, it is preferable that the apparatus be provided with means for detecting the amount of water present in the vessel and means for controlling the amount of water to be fed into the vessel based on the detected amount of water in the vessel. If the water amount in the vessel is maintained to a predetermined level, the flow rate of water fed into the vessel can be determined by adjusting the feed amount of water to be used for dilution.

Generally, when the production quantity of peroxymonosulfuric acid is changed using the production apparatus of the invention, the feed amounts of hydrogen peroxide, sulfuric acid, and dilution water are varied proportionally. In this case, if the water present in the vessel is not subjected to dilution, the cooling efficiency of water held in the vessel should be controlled to maintain the diluted peroxymonosulfuric acid solution at a predetermined temperature. In contrast to this, when the water present in the vessel is used for dilution, the diluted peroxymonosulfuric acid solution can be kept at a constant temperature just merely by proportionally varying the flow rate of each liquid.

The portions where the hydrogen peroxide feed pipe meets the sulfuric acid feed pipe and the portions of the first static mixer and the reaction solution transporting pipe where the reactants or the reaction solution come in contact may be preferably made of fluoroplastics, Hastelloy (registered trademark) C or tantalum.

Preferably, the apparatus of the invention may be provided with means for detecting the temperature of the reaction solution released from the first static mixer and means for cutting the supply of hydrogen peroxide and/or sulfuric acid based on the temperature of the reaction solution released from the first static mixer. This can detect the increase in temperature resulting from the abnormal decomposition of hydrogen peroxide and the decrease in temperature resulting from the leakage of the reaction solution around the first static mixer, and immediately cut the supply of the starting materials in response to the detected temperature changes.

Furthermore, the apparatus of the invention may be provided with means for detecting the temperature of the reaction solution released from the second static mixer and means for cutting the supply of hydrogen peroxide and/or sulfuric acid based on the temperature of the reaction solution released from the second static mixer. This can detect the increase in temperature resulting from the cut supply of water for dilution and the decrease in temperature resulting from the leakage of the reaction solution around the second static mixer, and immediately cut the supply of the materials in response to the detected temperature changes.

Figure 2:
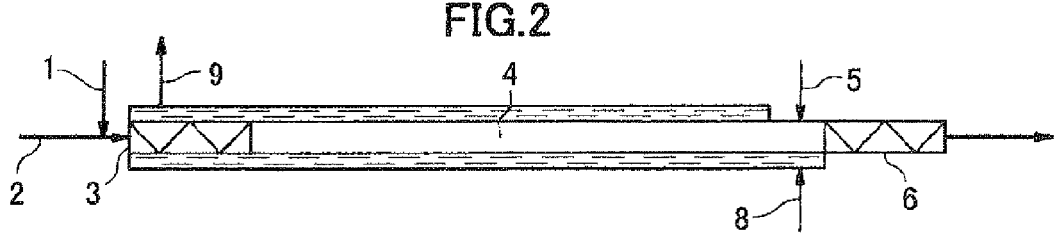
FIG. 2 is a diagram showing another example of the apparatus of the invention for continuously producing peroxymonosulfuric acid.

With reference to FIGS. 1 to 3, specific examples of the apparatus for continuously producing peroxymonosulfuric acid according to the invention will now be explained.

In FIG. 1, a first static mixer 3 is disposed immediately downstream from the meeting point of a hydrogen peroxide feed pipe 1 and a sulfuric acid feed pipe 2. A second static mixer 6 is disposed immediately downstream from the meeting point of a reaction solution transporting pipe 4 located downstream from the first static mixer 3 and a dilution water feed pipe 5. The first static mixer 3 and the reaction solution transporting pipe 4 are located underwater in a water vessel 7. A water feed pipe 8 for feeding water into the water vessel 7 and a water discharge pipe 9 for discharging water from the water vessel 7 are separately connected to the water vessel 7. The water discharge pipe 9 is located at a position higher than the location of the first static mixer 3 and the reaction solution transporting pipe 4, to allow the water in the water vessel 7 to overflow.

In FIG. 2, a first static mixer 3 is disposed immediately downstream from the meeting point of a hydrogen peroxide feed pipe 1 and a sulfuric acid feed pipe 2. A second static mixer 6 is disposed immediately downstream from the meeting point of a reaction solution transporting pipe 4 located downstream from the first static mixer 3 and a dilution water feed pipe 5. A housing unit of the first static mixer 3 and the reaction solution transporting pipe 4 are made a double tube in such a fashion that the gap between the inner tube and the outer tube can be filled with water using a water feed pipe 8 for feeding water into the gap and a water discharge pipe 9 for discharging water therefrom.

In FIG. 3, a first static mixer 3 is disposed immediately downstream from the meeting point of a hydrogen peroxide feed pipe 1 and a sulfuric acid feed pipe 2. A second static mixer 6 is disposed immediately downstream from the meeting point of a reaction solution transporting pipe 4 located downstream from the first static mixer 3 and a dilution water feed pipe 5. The first static mixer 3, the reaction solution transporting pipe 4, and the second static mixer 6 are located underwater in a water vessel 7.

A water feed pipe 8 for feeding water into the water vessel 7 and a water discharge pipe 9 for discharging water from the water vessel 7 are separately connected to the water vessel 7. The opposite end of the water discharge pipe 9 is connected to the suction port of a dilution water pump 10. The discharge port of the dilution water pump 10 is separately connected to the water vessel 7 via a circulating pipe 11 for circulating water in the vessel and to a part upstream from the second static mixer 6 via the dilution water feed pipe 5.

A flow rate indicating regulator 12 is disposed along the path of the dilution water feed pipe 5 to control the flow rate of the dilution water. Further, a level detector 13 is allowed to detect the level of water in the water vessel 7 and send the output signals to a controller 14, thereby controlling the operation of a valve 15 located in the water feed pipe 8 for feeding water into the water vessel. The level of water in the water vessel 7 is thus kept within a predetermined range, so that the amount of the dilution water fed into the water vessel is made substantially the same as that of water fed into the water vessel.

A thermometer 16 is disposed along the path of the reaction solution transporting pipe 4 to detect the temperature of the reaction solution and send the output signals to a controller 17. This can halt the operations of a hydrogen peroxide feeding system 18 and a sulfuric acid feeding system 19 in the event that the abnormal temperature of the reaction solution is detected. In addition, a thermometer 21 disposed downstream from the second static mixer 6 along the path of a diluted peroxymonosulfuric acid solution transporting pipe 20 can detect the temperature of the diluted peroxymonosulfuric acid solution and send the output signals to the controller 17. This can halt the operations of the hydrogen peroxide feeding system 18 and the sulfuric acid feeding system 19 in the event that the abnormal temperature of the diluted peroxymonosulfuric solution is detected.

The apparatus of the invention may be further provided with means for mixing with an aqueous alkaline solution, if necessary. To be more specific, the second static mixer may be provided with means for mixing an aqueous alkaline solution with the reaction solution, for example. A third static mixer may be disposed downstream from the first static mixer and upstream or downstream from the second static mixer and made to serve as means for mixing an aqueous alkaline solution with the reaction solution, for example. Preferably, the third static mixer may be located underwater in the vessel. The means for adding an aqueous alkaline solution is a feed pipe for an aqueous alkaline solution, which pipe may be provided with a back pressure control valve. In the case where water held in the vessel is used as dilution water, means for adding an aqueous alkaline solution to water held in the vessel may be provided.

EXAMPLES

The invention will now be explained more specifically with reference to the following examples. The concentrations of chemicals used herein are represented by percentage by mass. The following examples are given for illustration of the invention and are not intended to be limiting thereof.

The peroxymonosulfuric acid was analyzed by the method shown below.

(1) One gram of the generated peroxymonosulfuric acid solution was weighed in a 50-ml volumetric flask and pure water was added to obtain a volume.
(2) To a conical beaker charged with pure water, 10 ml of 4N sulfuric acid and ice, 5 ml of the product (1) was added.
(3) Several drops of ortho-phenanthroline indicator were added.
(4) The solution (3) was titrated with 1/40N cerium(IV) sulfate solution. The titer until the color of the solution varied from red to blue was expressed by a (ml)
(5) To a conical beaker charged with pure water, 10 ml of 4N sulfuric acid and ice, 5 ml of the product (1) was added.
(6) An appropriate amount of potassium iodide was added.
(7) Several drops of a saturated solution of ammonium molybdate were added.
(8) The solution (7) was titrated with 1/10N sodium thiosulfate solution. A starch indicator was added near the end point. The titer until the color of the solution varied from purple to colorless was expressed by b (ml).
(9) Calculation of chemical concentration $$\text{Concentration of peroxymonosulfuric acid} \\ (\%)=5.7309 \times (b-a/4) \times (50/5/\text{sample amount}) \times 0.1$$

$$\text{Concentration of hydrogen peroxide } (\%)=1.701 \times (a/4) \times (50/5/\text{sample amount}) \times 0.1$$

Example 1

150 g (1.5 mol) of 98% sulfuric acid was placed into a 500-ml conical beaker, which was dipped in cold water. With stirring with a stirrer, 37.78 g (0.5 mol) of 45% hydrogen peroxide was added to the sulfuric acid over a period of 15 seconds to mix together, so that a peroxymonosulfuric acid solution was synthesized (the maximum temperature reached during the reaction was 92° C.). When the liquid temperature reached as low as 25° C. (five minutes later after initiation of the mixing operation), the solution was diluted with water of 20° C. in an amount of 1126.7 g (equivalent to six times as much as the solution), so that the concentration of the peroxymonosulfuric acid in the diluted solution was 2.97%. The concentration of peroxymonosulfuric acid in the solution (before dilution) was 21.1% one minute later after initiation of the addition. The remaining ratio of the peroxymonosulfuric acid after dilution was found to be 98.7% when calculated based on the above-mentioned concentration before dilution.

Examples 2 to 4

The procedures in Example 1 were repeated except that the peroxymonosulfuric acid solution was diluted with water when the liquid temperature reached as low as 40° C. (three minutes later after initiation of the mixing operation), 60° C. (two minutes later after initiation of the mixing operation), and 80° C. (1.5 minutes later after initiation of the mixing operation), respectively in Examples 2, 3 and 4.

Example 5

The procedures in Example 1 were repeated except that the beaker was dipped in ice water to control the maximum reaction temperature to 82° C. and that the peroxymonosulfuric acid solution was diluted with water when the liquid temperature reached as low as 80° C. (30 seconds later after initiation of the mixing operation).

Comparative Example 1

The procedures in Example 1 were repeated except that the peroxymonosulfuric acid solution was diluted with water when the liquid temperature reached as low as 90° C. (one minute later after initiation of the mixing operation).

Comparative Examples 2 and 3

The procedures in Example 1 were repeated except that the beaker was dipped in cold water after the addition of hydrogen peroxide (the maximum temperature reached during the reaction was 136° C.) and the peroxymonosulfuric acid solution was diluted with water when the liquid temperature reached as low as 110° C. (two minutes later after initiation of the mixing operation) and 130° C. (one minute later after initiation of the mixing operation), respectively in Comparative Examples 2 and 3.

Comparative Example 4

The procedures in Example 1 were repeated except that the beaker was dipped in refrigerant of 10° C. (the maximum temperature reached during the reaction was 68° C.) and that the peroxymonosulfuric acid solution was diluted with water when the liquid temperature reached as low as 65° C. (30 seconds later after initiation of the mixing operation).

TABLE 1

|  | Reaction Temp. (° C.) | Temp. of Peroxymonosulfuric Acid just before Dilution (° C.) | $H_2SO_5$ (%) | $H_2O_2$ (%) | $H_2SO_5$ Remaining Ratio (%) |
| --- | --- | --- | --- | --- | --- |
| Ex. 1 | 92 | 25 | 2.97 | 0.368 | 98.7 |
| Ex. 2 | 92 | 40 | 2.98 | 0.365 | 99.0 |
| Ex. 3 | 92 | 60 | 2.91 | 0.386 | 96.8 |
| Ex. 4 | 92 | 80 | 2.79 | 0.422 | 92.8 |
| Ex. 5 | 82 | 80 | 2.78 | 0.425 | 92.4 |
| Comp. Ex. 1 | 92 | 90 | 2.45 | 0.523 | 81.3 |
| Comp. Ex. 2 | 136 | 110 | 1.92 | 0.681 | 63.8 |
| Comp. Ex. 3 | 136 | 130 | 1.24 | 0.884 | 41.1 |
| Comp. Ex. 4 | 68 | 65 | 2.63 | 0.470 | 87.4 |

The production of peroxymonosulfuric acid is accompanied by significant evolution of heat ascribed to hydration of sulfuric acid. Therefore, the reaction was carried out with cooling. Table 1 shows the effect of the temperature of peroxymonosulfuric acid immediately before the dilution on the remaining ratio of peroxymonosulfuric acid. As can be seen from the results, the remaining ratio of peroxymonosulfuric acid decreases and the concentration of hydrogen peroxide increases when the peroxymonosulfuric acid is diluted at 90° C. or higher. The preferable temperature of the generated peroxymonosulfuric acid solution is found to be 80° C. or lower when the solution is subjected to dilution.

Examples 6 to 8

The procedures in Example 1 were repeated except that the liquid temperature of the peroxymonosulfuric acid solution was decreased to 80° C. and the cooling rate of the peroxymonosulfuric acid solution was changed to control the time elapsing before the liquid temperature reached 80° C. to 1, 2.5, and 5 minutes, respectively in Examples 6, 7 and 8 by adjusting the temperature of the water for cooling.

Comparative Examples 5 to 7

The procedures in Example 1 were repeated except that the liquid temperature of the peroxymonosulfuric acid solution was decreased to 80° C. and the cooling rate of the peroxymonosulfuric acid solution was changed to control the time elapsing before the liquid temperature reached 80° C. to 7, 10 and 15 minutes, respectively in Comparative Examples 5, 6 and 7 by adjusting the temperature of the water for cooling.

TABLE 2

|  | Time Elapsing before Dilution (min.) | $H_2SO_5$ (%) | $H_2SO_5$ Remaining Ratio (%) |
| --- | --- | --- | --- |
| Ex. 6 | 1 | 2.80 | 93.0 |
| Ex. 7 | 2.5 | 2.78 | 92.4 |
| Ex. 8 | 5 | 2.72 | 90.4 |
| Comp. Ex. 5 | 7.5 | 2.49 | 83.8 |
| Comp. Ex. 6 | 10 | 2.07 | 69.7 |
| Comp. Ex. 7 | 15 | 1.68 | 56.6 |

Table 2 shows the effects of the time elapsing between the production of peroxymonosulfuric acid solution and the dilution thereof. The results show that the remaining ratio of peroxymonosulfuric acid decreases when the time interval is 7.5 minutes or more. The time interval of five minutes or less is found to be advantageous.

Example 9

150 g (1.5 mol) of 98% sulfuric acid was placed into a 500-ml conical beaker, and 37.78 g (0.5 mol) of 45% hydrogen peroxide was added to sulfuric acid as stirring with a stirrer. Immediately after completion of the addition, the beaker was dipped in ice water. The temperature of peroxymonosulfuric acid solution increased up to 95° C. at the maximum. When the liquid temperature reached as low as 40° C. (three minutes later after initiation of the mixing operation), the solution was diluted with water of 20° C. in an amount of 751.1 g (equivalent to four times as much as the solution). The solution thus diluted was allowed to stand for 0.5 hours, 12 hours, 24 hours, and three days in a constant temperature oven of 40° C. to examine the stability of the solution.

Examples 10 and 11

The procedures in Example 9 were repeated except that the mass of water used for dilution was 10 times and 20 times as much as the peroxymonosulfuric acid solution, respectively in Examples 10 and 11.

Comparative Examples 8 and 9

The procedures in Example 9 were repeated except that the mass of water used for dilution was 0 time and 2 times as much as the peroxymonosulfuric acid solution, respectively in Comparative Examples 8 and 9.

Examples 12 to 14

The iron content in the sulfuric acid used in Example 1 was 5 ppm. The procedures in Example 1 were repeated except that iron was further added to increase the iron content in the sulfuric acid by 5 ppm, 10 ppm and 15 ppm, respectively in Examples 12, 13 and 14. The concentrations of peroxymonosulfuric acid were determined immediately after the production thereof and after standing at 40° C. for 24 hours.

In the above, iron was added in the form of ferrous sulfate.

Comparative Examples 10 to 12

The procedures in Example 1 were repeated except that iron was further added to increase the iron content in the sulfuric acid by 25 ppm, 50 ppm and 100 ppm, respectively in Comparative Examples 10, 11 and 12. The concentrations of peroxymonosulfuric acid were determined immediately after the production thereof and after standing at 40° C. for 24 hours. In the above, iron was added in the form of ferrous sulfate.

TABLE 3

| | Dilution Water Amount (Value indicating how many times dilution water is as heavy as peroxymonosulfuric acid solution) | Concentration (%) of $H_2SO_5$ after Storage | | | | |
|---|---|---|---|---|---|---|
| | | 0 h. | 0.5 h. | 12 h. | 24 h. | 3 days |
| Ex. 9 | 4 | 4.51 (100)* | 4.50 (99.8) | 4.27 (94.7) | 4.01 (88.9) | 3.84 (85.1) |
| Ex. 10 | 10 | 2.20 (100) | 2.20 (100) | 2.18 (99.1) | 2.14 (97.3) | 2.07 (94.1) |
| Ex. 11 | 20 | 1.10 (100) | 1.10 (100) | 1.10 (100) | 1.10 (100) | 1.09 (99.1) |
| Comp. Ex. 8 | 0 | 22.0 (100) | 20.3 (92.3) | 18.2 (82.7) | 16.4 (74.5) | 11.6 (52.7) |
| Comp. Ex. 9 | 2 | 7.02 (100) | 6.20 (88.3) | 4.42 (62.9) | 2.75 (39.2) | 1.83 (26.1) |

*Figures in parentheses indicate the retention ratio (%).

Table 3 shows the results of the test for stability of the peroxymonosulfuric acid solution. The figures of the upper rows indicate the concentration of peroxymonosulfuric acid calculated by the method previously mentioned. The remaining ratio of peroxymonosulfuric acid after the expiration of each time interval was calculated on a basis of 100 of the concentration of peroxymonosulfuric acid before storage (i.e., 0 hour) and expressed as the retention ratio on the lower rows. The stability of the highly concentrated peroxymonosulfuric acid solution is considerably poor at the time of production thereof, so that the solution should be used immediately after the production thereof. However, in the invention, the stability is improved by dilution with water, which makes it possible to store the peroxymonosulfuric acid solution for a long period of time. The amount of water used for dilution is preferably four times or more as much as the peroxymonosulfuric acid solution by mass.

TABLE 4

| | Addition of Fe (ppm) | $H_2SO_5$ (%) (Immediately after Production) | $H_2SO_5$ (%) (After 24 hours) |
|---|---|---|---|
| Ex. 1 | 0 | 3.01 | 2.98 |
| Ex. 12 | 5 | 3.01 | 2.94 |
| Ex. 13 | 10 | 3.00 | 2.91 |
| Ex. 14 | 15 | 2.97 | 2.83 |
| Comp. Ex. 10 | 25 | 2.84 | 2.29 |
| Comp. Ex. 11 | 50 | 2.61 | 1.87 |
| Comp. Ex. 12 | 100 | 2.36 | 1.48 |

With respect to the quality of sulfuric acid, the use of sulfuric acid having an Fe content of 20 ppm or less is advantageous because the concentration of peroxymonosulfuric acid is high immediately after the production thereof, and the high concentration can be kept after an elapse of 24 hours.

Example 15

Peroxymonosulfuric acid was continuously produced using an apparatus as previously explained with reference to FIG. 3.

45% hydrogen peroxide and 98% sulfuric acid were respectively sent to a hydrogen peroxide feed pipe 1 at a flow rate of 150 kg/h and a sulfuric acid feed pipe 2 at a flow rate of 600 kg/h by operating the respective pumps. Hydrogen peroxide were mixed with sulfuric acid to react them in a first static mixer 3 located immediately downstream from the meeting point of the two reactants. The reaction was carried out at 92° C. A commercially available static mixer Model N-60 made by Noritake Co., Limited (material for housing: Hastelloy C-22, material for elements: PTFE) was used as the first static mixer, which was located underwater so that all the surfaces of the mixer came in contact with water. The reaction solution released from the first static mixer was caused to pass through a reaction solution transporting pipe 4 with an inner diameter of 17 mm and a length of 100 m connected to the downstream port of the first static mixer 3 so that the temperature of the reaction solution was decreased to as low as 40° C. immediately before flowing into a second static mixer. The time that elapsed before the reaction solution reached the second static mixer since having left the first static mixer was three minutes. The downstream port of the reaction solution transporting pipe 4 was connected to the second static mixer, both of which were located underwater. Water was charged into the second static mixer in such an amount as to correspond to 10 times as much as the reaction solution by mass through a dilution water feed pipe 5 at a flow rate of 7580 kg/h. The reaction solution was thus mixed with the dilution water in the second static mixer, and peroxymonosulfuric acid was produced (in a yield of 70% with reference to hydrogen peroxide). The peroxymonosulfuric acid thus obtained was allowed to stand at 40° C. under the same conditions as mentioned in Example 9, and thereafter the stability of peroxymonosulfuric acid solution was evaluated. The retention ratio obtained was similar to that in Example 9.

[Reference Signs List]
1 Hydrogen peroxide feed pipe
2 Sulfuric acid feed pipe
3 First static mixer
4 Reaction solution transporting pipe
5 Dilution water feed pipe
6 Second static mixer
7 Water vessel
8 Pipe for feeding water into vessel
9 Pipe for discharging water from vessel

CITATION LIST

Patent Literature

[PTL 1] U.S. Pat. No. 2,789,954
[PTL 2] Japanese Patent Unexamined Publication (JP Kokai) Sho 57-132591
[PTL 3] National publication of the translated version (of PCT application) Hei 6-501672
[PTL 4] U.S. Pat. No. 5,141,731
[PTL 5] Japanese Patent Unexamined Publication (JP Kokai) Hei 10-95602

The invention claimed is:
1. A method for continuously producing a peroxymonosulfuric acid solution with high stability, comprising the steps of:
cooling 35 mass % concentration or more of hydrogen peroxide and 70 mass % concentration or more of sulfuric acid, respectively,
mixing the cooled hydrogen peroxide and the cooled sulfuric acid to form a mixture while cooling the mixture for at least 1 minute and shorter than 5 minutes to react the mixture at 90° C. or higher, thereby obtaining a reaction solution;
further cooling the reaction solution to 40° C. or higher and 80° C. or lower; and
then diluting the reaction solution with water 4 times or more and 20 times or less as much as the reaction solution by mass;
wherein before the dilution step, the cooled hydrogen peroxide and the cooled sulfuric acid is mixed while cooling, and further cooled within 5 minutes from the start of the mixing step.

2. The method of claim 1, wherein the reaction solution is diluted with water weighing 4 times or more and 10 times or less as much as the reaction solution.

3. The method of claim 1, wherein the sulfuric acid contains 20 ppm or less of iron.

4. The method of claim 1, further comprising the step of adding an aqueous alkaline solution to the reaction solution after the reaction solution is cooled to 80° C. or lower.

5. A method for continuously producing a peroxymonosulfuric acid solution, comprising the steps of:
cooling 35 mass % concentration or more of hydrogen peroxide and 70 mass % concentration or more of sulfuric acid, respectively,
mixing the cooled hydrogen peroxide and the cooled sulfuric acid to form a mixture while cooling the mixture for at least 1 minute and shorter than 5 minutes to react the mixture at 80° C. or higher, thereby obtaining a reaction solution;
further cooling the reaction solution to 40° C. or higher and 80° C. or lower; and
then diluting the reaction solution with water four times or more and 20 times or less as much as the reaction solution by mass;
wherein before the dilution step, the cooled hydrogen peroxide and the cooled sulfuric acid is mixed while cooling, and further cooled within 5 minutes from the start of the mixing step.

6. A method for continuously producing a peroxymonosulfuric acid solution, comprising the steps of:
cooling 35 mass % concentration or more of hydrogen peroxide and 70 mass % concentration or more of sulfuric acid, respectively,
mixing the cooled hydrogen peroxide and the cooled sulfuric acid to form a mixture while cooling the mixture for at least 1 minute and shorter than 5 minutes to react the mixture at 80° C. or higher, thereby obtaining a reaction solution;
further cooling the reaction solution to a temperature of 40° C. or higher and 80° C. or lower, the temperature is achieved within five minutes from the start of the mixing step; and
then diluting the reaction solution with water four times or more and 20 times or less as much as the reaction solution by mass,
wherein the steps are in carried out in the apparatus as an apparatus for continuously producing peroxymonosulfuric acid, comprising:
a first static mixer for mixing hydrogen peroxide with sulfuric acid to react them, thereby obtaining a reaction solution;

a second static mixer for mixing the reaction solution obtained in the first static mixer with a dilution water; and a reaction solution transporting pipe for transporting the reaction solution from the first static mixer to the second static mixer, with the first static mixer and the reaction solution transporting pipe being disposed underwater in a vessel.

7. The method of claim 6, wherein the reaction solution is diluted with water weighing 4 times or more and 10 times or less as much as the reaction solution.

8. The method of claim 6, wherein the sulfuric acid contains 20 ppm or less of iron.

9. The method of claim 6, further comprising the step of adding an aqueous alkaline solution to the reaction solution after the reaction solution is cooled to 80° C. or lower.

10. The method of claim 1, wherein the hydrogen peroxide and sulfuric acid is reacted at the temperature of 90° C. to 120° C.

11. The method of claim 5, wherein the hydrogen peroxide and sulfuric acid is reacted at the temperature of 90° C. to 120° C.

12. The method of claim 6, wherein the hydrogen peroxide and sulfuric acid is reacted at the temperature of 90° C. to 120° C.

13. The method of claim 1, wherein the cooled hydrogen peroxide and the cooled sulfuric acid are mixed for at least 1 minute while further cooling to react them at 90° C. or higher and 120° C. or lower.

14. The method of claim 5, wherein the cooled hydrogen peroxide and the cooled sulfuric acid are mixed for at least 1 minute while further cooling to react them at 90° C. or higher and 120° C. or lower.

15. The method of claim 6, wherein the cooled hydrogen peroxide and the cooled sulfuric acid are mixed for at least 1 minute while further cooling to react them at 90° C. or higher and 120° C. or lower.

* * * * *